Nov. 15, 1932.     G. G. STANFORD     1,887,568
NUT LOCK

Filed July 26, 1930

INVENTOR.
George G. Stanford
BY
Harry Schroeder
ATTORNEY

Patented Nov. 15, 1932

1,887,568

UNITED STATES PATENT OFFICE

GEORGE G. STANFORD, OF OAKLAND, CALIFORNIA

NUT LOCK

Application filed July 26, 1930. Serial No. 470,867.

The invention is a nut lock and has special reference to a locking device which will prevent the loosening of the nut under extreme conditions of vibration, and which remains effective even under conditions of stretching of the bolt or stud.

The main object of the invention is to provide a nut lock, which will positively prevent backing up of a nut and which will permit the taking up of a nut and locking the nut at any point of adjustment, and which will remain effective even if the nut is not drawn down tightly.

Another object of the invention is to provide a device of the class described which is applied at the upper or non-engaging end of the nut and after tightening thereof, the lock being effective irrespective of the position of the nut or its adjustment.

Other objects of the invention will be apparent as the description is set forth, when read on the drawing forming a part of this specification.

The invention consists primarily of a locking device consisting of a helical spring of one to two turns and of a pitch approximately equal to the pitch of the screw thread, and of such diameter as to resiliently engage the opposite thread surfaces when threaded thereon, the upper end of the spring having a radial extension for convenient manipulation, and a nut having a counterbore of sufficient diameter to clear the spring when placed on the screw, whereby the spring is prevented from spreading by unscrewing of the nut.

The invention is adequately illustrated in the accompanying drawing in which.

Figure 1:
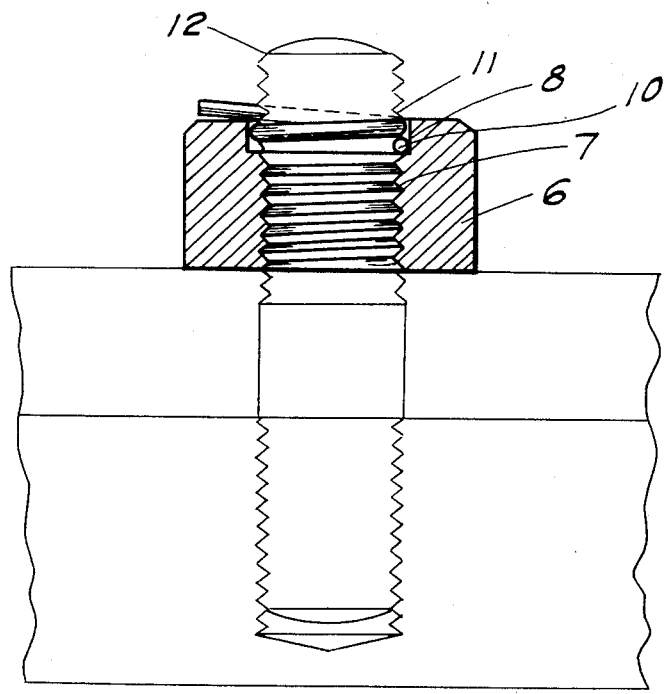
Fig. 1 is a sectional elevation through the nut, indicating the nut lock in position and as applied to a stud.
Figure 2:
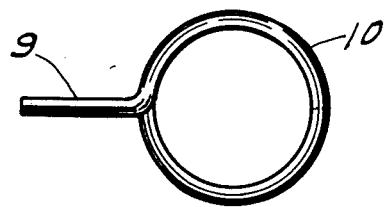
Fig. 2 is a top plan view of the nut lock.
Figure 3:
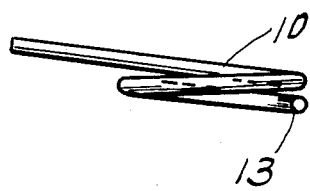
Fig. 3 is an elevation of the nut lock.

Similar reference characters are used to designate similar parts throughout the several views. The nut 6 is of any conventional type, threaded as at 7 and provided with a counterbore 8 of sufficient diameter to just clear the spring 10 when the spring is disposed in the threads 11 of the stud 12.

The nut lock consists of one or more turns of spring wire 10, and wound to a pitch just sufficient to resiliently grip into the threads 11, and has a radial extension 9 whereby the spring may be screwed onto the stud or screw 12. It has been found that the best results are obtained by the use of approximately one and one-half turns as indicated in the drawing although the number of turns may readily be varied and still obtain satisfactory results.

The operation of the device is as follows:

The nut 6 is screwed down tightly, after which the nut lock is threaded onto the screw 12 and by means of the extension 9 screwed down until the lower surface 13 of the nut lock seats at the bottom of counterbore 8.

The nut lock slightly grips in the threads 11 and thereby is frictionally prevented from unscrewing, and, as any reverse movement of nut 6 would have only frictional engagement with the surface 13 which would have a reaction against the threads 11 at the opposite side, the nut could not possibly cause the nut lock to turn and therefore would be retained in position against any action of the nut due to vibration or even applied torque.

Having described an operative method of constructing and using the invention, it will be understood that variations in construction and arrangement of parts which are consistent with the appended claims, may be resorted to without detracting from the spirit or scope of the invention or sacrificing any of the advantages thereof. I am aware that nut locking devices have been made, therefore I do not claim such a device broadly, but I do claim:

1. A nut lock, in combination, a helix of spring wire, one end thereof being formed into a radial extension, said helix being of such diameter as to permit screwing onto a threaded member and in frictional engagement therewith and of a pitch substantially equal to the pitch of the threads of said threaded member, and, a nut provided with a counterbore of such diameter as to freely receive said helix, and substantially prevent expansion thereof, the depth of said counterbore being substantialy equal to the length of said helix minus said radial extension said helix frictionally cooperating with said threads and with the bottom of said counterbore.

2. In combination with a threaded bolt and a nut cooperating therewith; a helix of more than one and less than two turns and having a lever arm formed at one end, a counterbore in said nut adapted to prevent expansion of said helix, said helix being applied independently of said nut and frictionally cooperating with the bottom of the counterbore and with the threads on said bolt.

3. A nut lock comprising, in combination with a threaded member, a helix formed of resilient wire and consisting of more than one and less than two turns, and of a pitch substantially equal to the pitch of said threaded member and of a diameter adapted for frictional engagement therewith, one end of said helix terminating in a lever arm, a cooperating nut provided with a counterbore of a diameter substantially equal to the outside diameter of said helix to prevent expansion thereof, said helix being adapted only for frictional engagement with said nut and independently operable.

In testimony whereof I affix my signature.

GEORGE G. STANFORD.